US 6,728,053 B2

(12) United States Patent
Choo et al.

(10) Patent No.: US 6,728,053 B2
(45) Date of Patent: Apr. 27, 2004

(54) METHOD AND APPARATUS TO REDUCE RETRY REDUNDANCY DURING READ OPERATIONS

(75) Inventors: SweeKieong Choo, Singapore (SG); WeiLoon Ng, Singapore (SG); BengWee Quak, Singapore (SG); Wesley WingHung Chan, Singapore (SG); Kwee Teck Say, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 258 days.

(21) Appl. No.: 09/897,802

(22) Filed: Jun. 29, 2001

(65) Prior Publication Data

US 2002/0060874 A1 May 23, 2002

Related U.S. Application Data

(60) Provisional application No. 60/220,725, filed on Jul. 26, 2000.

(51) Int. Cl.[7] .................................................. G11B 5/09
(52) U.S. Cl. .......................................... 360/53; 360/31
(58) Field of Search .............................. 360/53, 65, 31; 714/55

(56) References Cited

U.S. PATENT DOCUMENTS

| 5,287,363 | A | * | 2/1994 | Wolf et al. .................. 360/53 |
| 5,386,405 | A | | 1/1995 | Fujiwara et al. .............. 369/59 |
| 5,438,462 | A | | 8/1995 | Copolillo ..................... 360/53 |
| 5,682,272 | A | | 10/1997 | Taroda et al. ................. 360/53 |
| 5,808,825 | A | | 9/1998 | Okamura |
| 5,808,994 | A | * | 9/1998 | Tanaka et al. ........... 369/59.19 |
| 6,122,235 | A | | 9/2000 | Arai ............................ 369/54 |
| 6,493,165 | B1 | * | 12/2002 | Satoh et al. .................. 360/65 |
| 6,523,142 | B1 | * | 2/2003 | Igari et al. .................... 714/55 |
| 2001/0010605 | A1 | * | 8/2001 | Aoki ............................ 360/53 |
| 2002/0054555 | A1 | * | 5/2002 | Karakawa et al. ........ 369/53.33 |
| 2002/0057510 | A1 | | 5/2002 | Hoskins et al. |

FOREIGN PATENT DOCUMENTS

WO WO 00/36603 6/2000

* cited by examiner

*Primary Examiner*—David Hudspeth
*Assistant Examiner*—Rocio Colon
(74) *Attorney, Agent, or Firm*—Westman, Champlin & Kelly, P.A.

(57) ABSTRACT

A method and apparatus for reducing retry redundancy during disc read operations in a disc drive system are provided in which a number of physical sectors to be read from the disc during read operations is first determined. An attempt is then made to read all sectors of the number of sectors during a first disc revolution. Failed sectors of the number of sectors during the first disc revolution are also identified. A retry cycle is then performed on the failed sectors during a second disc revolution following the completion of the attempt to read all sectors of the number of sectors during the first revolution.

25 Claims, 10 Drawing Sheets

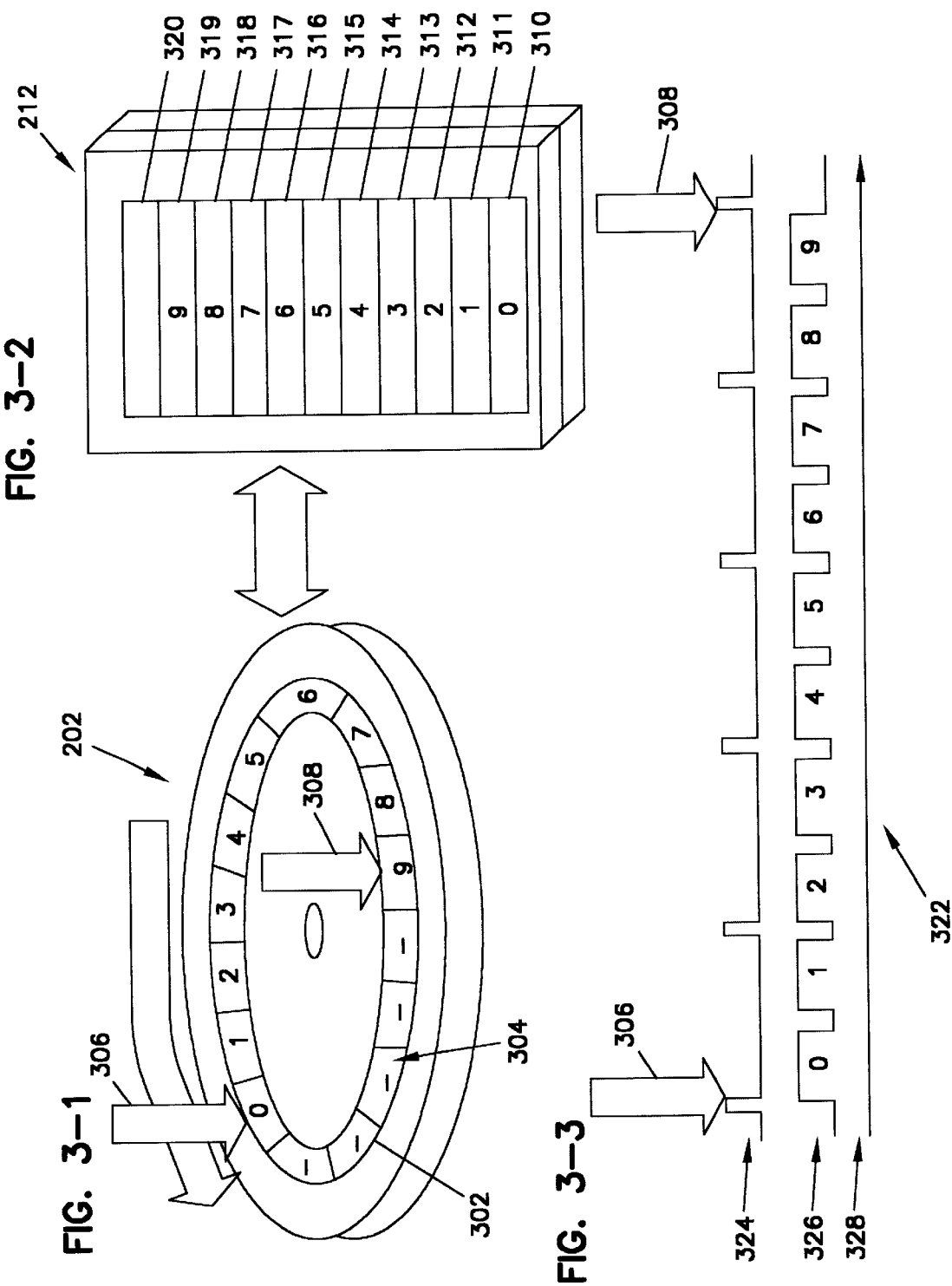

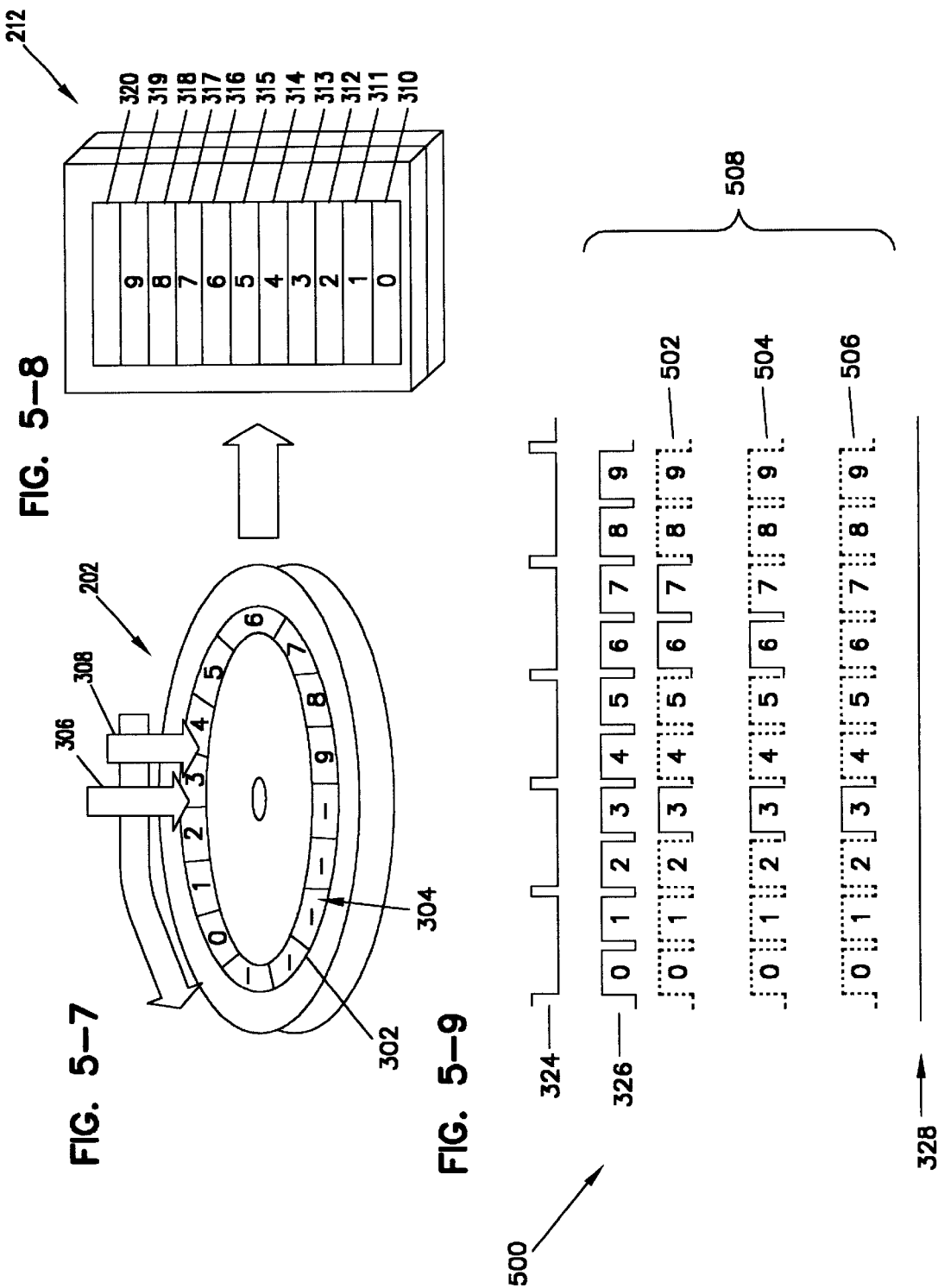

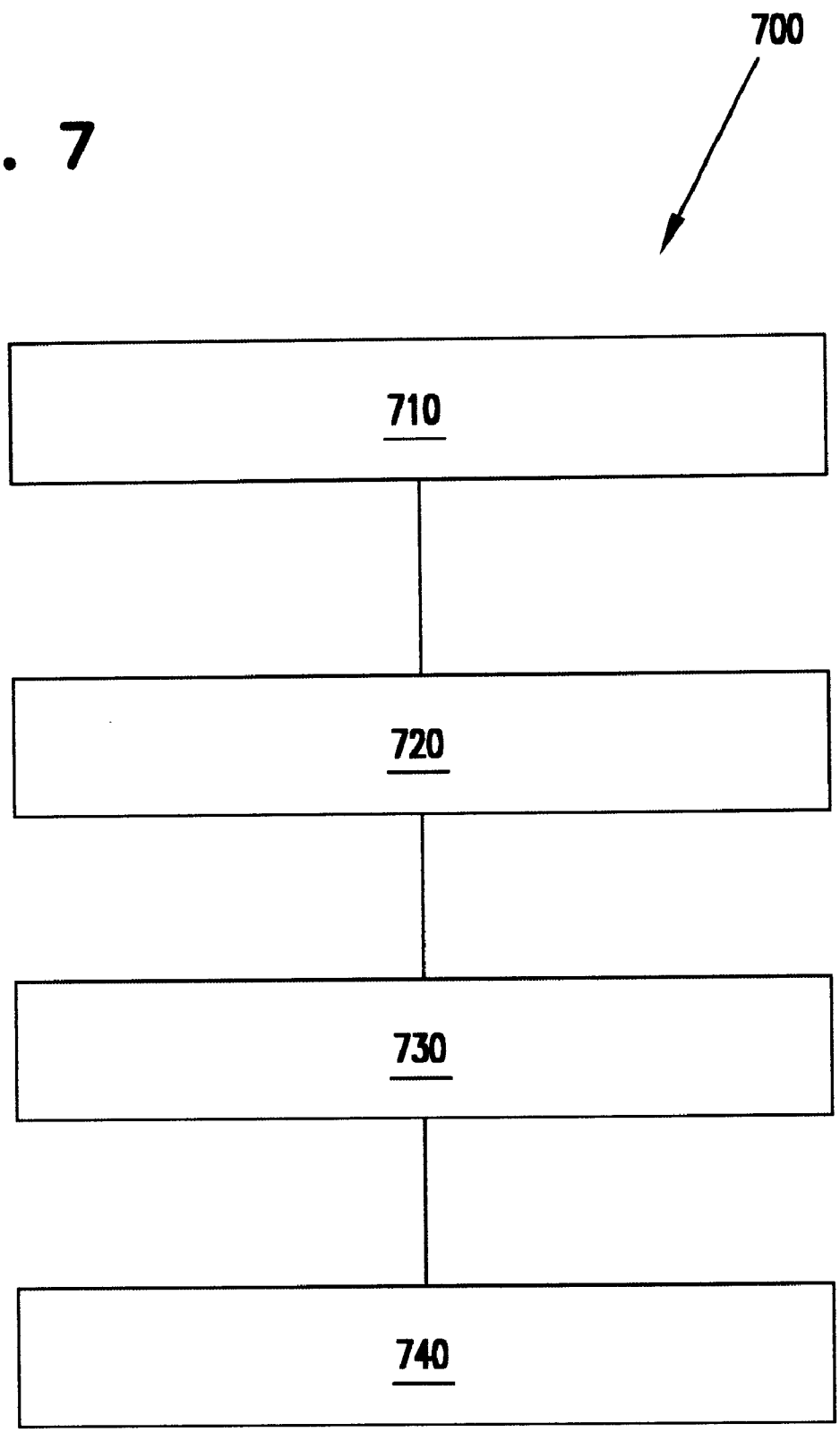

METHOD AND APPARATUS TO REDUCE RETRY REDUNDANCY DURING READ OPERATIONS

CROSS-REFERENCE TO RELATED APPLICATION

This application claims benefit of U.S. Provisional Application No. 60/220,725, filed Jul. 26, 2000, and entitled "METHOD TO REDUCE RETRY REDUNDANCY DURING READ OPERATIONS".

FIELD OF THE INVENTION

Various embodiments of the present invention relate to disc storage systems and, in particular, to reducing the number of disc revolutions required during read retry operations.

BACKGROUND OF THE INVENTION

In a disc drive, data is stored on one or more discs. A disc is typically divided into a plurality of generally parallel disc tracks, which are arranged concentrically with one another and perpendicular to the disc radius. Each track is further broken down into a plurality of sectors, which further aid in locating information.

The data is stored and retrieved by a transducer or "head" that is positioned over a desired track by an actuator arm. Typically, when a read operation is sent from a host (such as a computer) to the disc drive, a controller converts a logical block address (LBA) received from the host to a physical block address (PBA). Next, the physical track, head and sector information, which includes the number of sectors to be read from a destination track, are calculated based on the PBA. A seek operation is then performed and sectors falling on the same track are usually read within a disc revolution. Data read from the disc is transferred to a buffer random access memory (RAM) inside the disc drive. When a read operation is started, as many sectors on the track can be read without stopping when buffer RAM is available. A read error, however, will cause the read operation to stop, and a retry attempt to be performed. Therefore, a disc read operation may include read and retry cycles to recover data from the number of sectors to be read. Retry cycles are required to recover data from sectors on which read errors are encountered (failed sectors).

It is common to encounter disc read-errors when the disc drive is transferring data from the disc to the buffer RAM inside the disc drive. Although all data sectors written to the disc have error correction bytes appended at the end of the data field to protect the data from any kind of error, sector errors may still happen under a typical noisy environment. Some errors occur momentarily due to system noise, thermal conditions or external vibrations. These errors are referred to as soft errors and can normally be recovered by attempting to read the failed sector repeatedly until data is successfully recovered. The worst case error is a permanent error which happens due to defects on the disc. These permanent, or hard errors, can never be recovered even after repeated read attempts. In either case (occurrence of a soft or hard error), a retry cycle is always initiated by the controller which tries various approaches to recover data from failed sectors.

In typical prior art systems, when an error is encountered during a disc read operation, the controller stops the read operation, applies a retry algorithm and then re-starts the read operation. Stopping the read operation for each read error encountered and performing a retry cycle on the failed sector results in extra revolution time (overhead) for the read operation.

Various embodiments of the present invention address these problems, and offer other advantages over the prior art.

SUMMARY OF THE INVENTION

Various embodiments of the present invention relate to disc storage systems that have a retry cycle which solves the above-mentioned problems.

A method and apparatus for reducing retry redundancy during disc read operations in a disc drive system are provided in which a number of physical sectors to be read from the disc during read operations is first determined. An attempt is then made to read all sectors of the number of sectors during a first disc revolution. Failed sectors of the number of sectors during the first disc revolution are also identified. A retry cycle is then performed on the failed sectors during a second disc revolution following the completion of the attempt to read all sectors of the number of sectors during the first revolution.

These and various other features as well as advantages which characterize various embodiments of the present invention will be apparent upon reading of the following detailed description and review of the associated drawings.

BRIEF DESCRIPTION OF THE DRAWINGS

FIG. 3-1 illustrates a prior art read operation on a disc with no failed sectors during the read operation.

FIG. 3-2 shows memory locations into which sectors from the disc of FIG. 3-1 are read in accordance with the prior art read operation.

FIG. 3-3 is a timing diagram that shows a prior art read completed within a revolution with no failed sectors.

FIG. 4-1 shows a prior art disc read operation which has stopped at sector 3 due to a read error.

FIG. 4-2 shows the condition of memory locations in the prior art disc read operation when the read error shown in FIG. 4-1 occurs.

FIG. 4-3 shows an unsuccessful retry operation performed on sector 3 of the disc in accordance with the prior art disc read operation.

FIG. 4-4 shows the condition of memory locations at the end of the unsuccessful retry operation of FIG. 4-3 in accordance with the prior art disc read operation.

FIG. 4-5 shows a successful retry on sector 3 followed by a failed read on sector 6 in accordance with the prior art disc read operation.

FIG. 4-6 shows the condition of memory locations in the prior art disc read operation when the read error shown in FIG. 4-5 occurs.

FIG. 4-7 shows an unsuccessful retry operation on sector 6 in accordance with the prior art disc read operation.

FIG. 4-8 shows the condition of memory locations at the end of the unsuccessful prior art retry operation of FIG. 4-7.

FIG. 4-9 shows a successful retry on sector 6 but a failed read on sector 7 in accordance with the prior art disc read operation.

FIG. 4-10 shows the condition of memory locations in the prior art disc read operation when the read error shown in FIG. 4-9 occurs.

FIG. 4-11 shows a successful retry on sector 7 and the prior art disc read operation continuing to completion.

FIG. 4-12 shows the condition of memory locations when the prior art disc read operation for all sectors is complete.

FIG. 4-13 shows a timing diagram of the entire prior art read operation (FIGS. 4-1 through 4-12) with retry cycles performed on sectors 3, 6 and 7.

FIG. 5-1 shows a complete read cycle performed in accordance with one embodiment of the present invention where reads are attempted on all sectors even though intervening failed sectors are encountered.

FIG. 5-2 shows memory locations into which sectors from the disc of FIG. 5-1 are read.

FIG. 5-3 shows a complete first retry cycle where reads are attempted on all failed sectors (sectors 3, 6 and 7).

FIG. 5-4 shows the condition of memory locations at the end of the first retry cycle shown in FIG. 5-3.

FIG. 5-5 shows a complete second retry cycle where reads are attempted on remaining failed sectors 3 and 6 that were not recovered during the first retry cycle.

FIG. 5-6 shows the condition of memory locations at the end of the second retry cycle shown in FIG. 5-5.

FIG. 5-7 shows a complete third retry cycle where a read is attempted on remaining failed sector 3 that was not recovered at the end of the second retry cycle.

FIG. 5-8 shows the condition of memory locations at the end of the third retry cycle shown in FIG. 5-7.

FIG. 5-9 shows a timing diagram of the entire read operation (FIGS. 5-1 through 5-8) performed in accordance with one embodiment of the present invention.

FIG. 6 shows a list of retry registers which are updated during the read operation and used for subsequent retry cycles.

FIG. 7 shows a flow diagram of a method of performing a read operation in accordance with one embodiment of the present invention.

DETAILED DESCRIPTION

Figure 1:
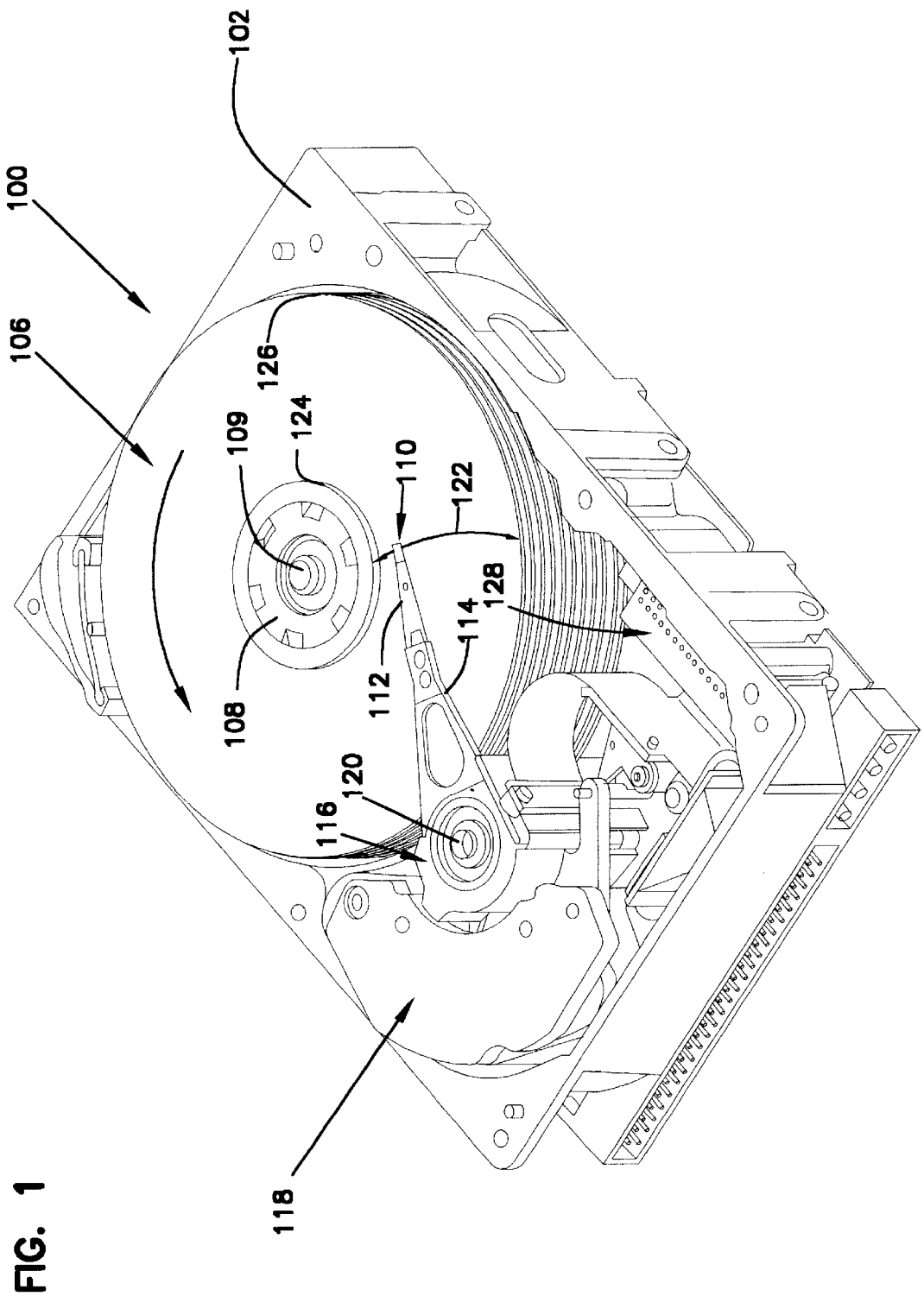
FIG. 1 is a perspective view of a head-disc assembly (HDA) with which various embodiments of the present invention are useful.

Referring now to FIG. 1, a perspective view of a magnetic disc drive, head disc assembly (HDA) 100 with which various embodiments of the present invention are useful is shown. The same reference numerals are used in the various figures to represent the same or similar elements. HDA 100 includes a housing with a base 102 and a top cover (not shown). HDA further includes a disc pack 106, which is mounted on a spindle motor (not shown) by a disc clamp 108. Disc pack 106 includes a plurality of individual discs which are mounted for co-rotation about central axis 109.

Each disc surface has an associated slider 110 which is mounted in HDA 100 and carries a read/write head for communication with the disc surface. In the example shown in FIG. 1, sliders 110 are supported by suspensions 112 which are in turn supported by track accessing arms 114 of an actuator 116. The actuator shown in FIG. 1 is of the type known as a rotary moving coil actuator and includes a voice coil motor (VCM), shown generally at 118. Other types of actuators can be used, such as linear actuators.

Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 operates under the control of a closed-loop servo controller within internal circuitry 128 based on position information, which is stored on one or more of the disc surfaces within dedicated servo fields. The servo fields can be interleaved with data sectors on each disc surface or can be located on a single disc surface that is dedicated to storing servo information. As slider 110 passes over the servo fields, the read/write head generates a readback signal that identifies the location of the head relative to the center line of the desired track. Based on this location, actuator 116 moves suspension 112 to adjust the head's position so that it moves toward the desired position. Once the transducing head is appropriately positioned, servo controller 128 then executes a desired read or write operation.

Figure 2:
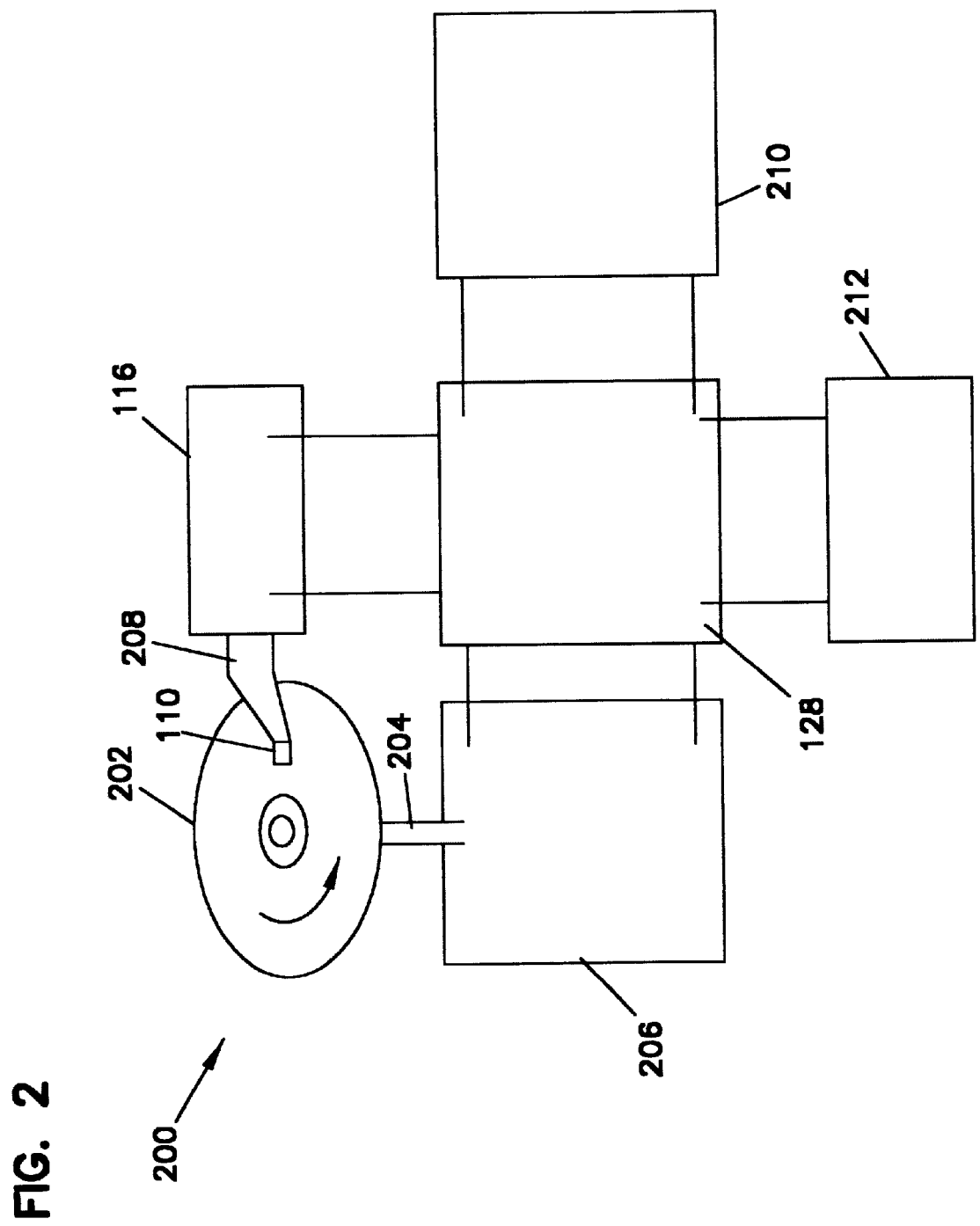
FIG. 2 is a simplified block diagram of a magnetic disc drive storage system in accordance with one embodiment of the present invention.

Referring now to FIG. 2, a simplified block diagram of a magnetic disc drive storage system 200 in accordance with one embodiment of the present invention is shown. For simplification, only one disc 202 of disc pack 106 (of FIG. 1) is shown. Spindle 204 connects disc 202 to spindle drive motor 206 which rotates disc 202 at high speed. Slider 110 that carries the read/write head is connected to actuator 116 through support arm 208. Controller 128 directs the action of actuator 116 which moves support arm 208. Host computer 210 is in communication with controller 128 which is adapted to receive commands from host 210 and operate the disc drive in accordance with these commands. When a read operation is sent from the host 210 to controller 128, the controller converts LBA received from the host to PBA. Based on the PBA, a seek is performed and data is read from the disc into disc drive buffer memory 212. When a read error occurs, any error correction algorithm that attempts to identify and correct the error at the failed sector is applied by controller 128. Failed sector identification information provided by the error correction algorithm is used by controller 128 to perform read retries.

Figures 1, 4:
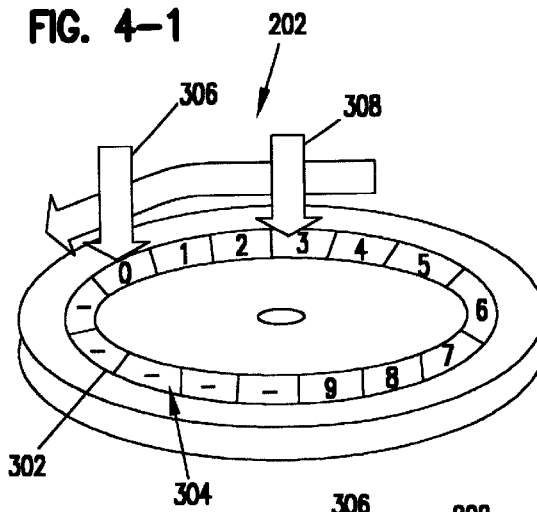
Figures 2, 4:
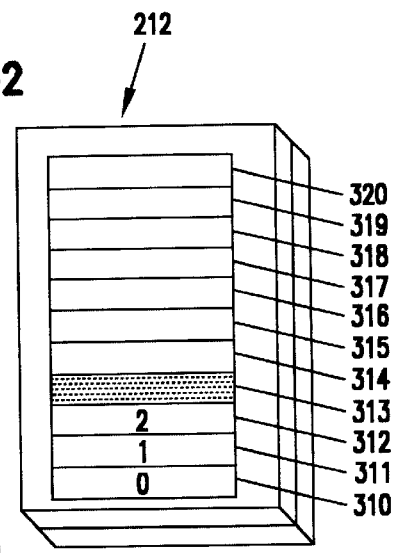
Figures 3, 4:
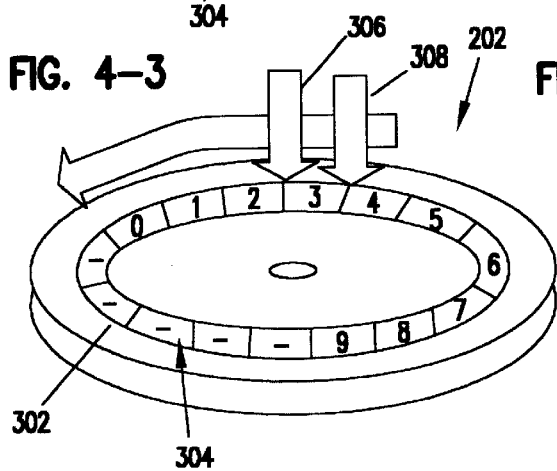
Figure 4:
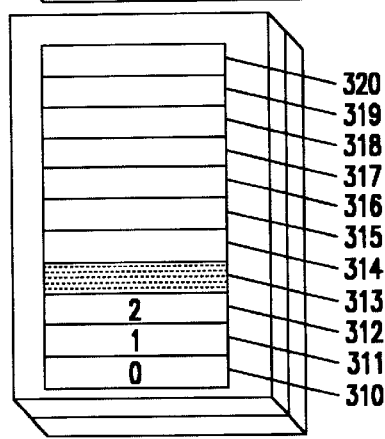

FIGS. 3-1, 3-2 and 3-3 collectively illustrate an example of a prior art read operation performed on a track of a disc where ten consecutive sectors are read from the track during one disc revolution, uninterrupted by read errors.

Referring now to FIG. 3-1, disc 202 on which track 302 is a destination track for the prior art read operation is shown. Track 302 includes a plurality of sectors 304 of which sectors 0–9 are the ten consecutive sectors read as per the example read operation. The disc start position 306 is shown at sector 0 (the first of ten sectors read) and the disc stop position 308 is at sector 9 (the tenth and last sector read). In FIG. 3-1, the read operation is shown to be completed without any read errors, and therefore, without any read retry attempts on any of sectors 0–9.

Referring now to FIG. 3-2, a section of buffer memory 212 that includes eleven memory locations 310–320 is shown. At the end of the prior art read operation of this example, memory locations 310–319 are populated with data recovered from sectors 0–9, with data recovered from sector 0 stored in memory location 310, data from sector 1 stored in memory location 311, etc. Memory location 320 is empty.

Referring now to FIG. 3-3, a timing diagram 322 of the prior art read operation of the above example is shown. Timing diagram 322 includes states of servo gate 324 and read gate 326 plotted along time axis 328 over the duration of the read cycle which begins at disc start position 306 and ends at disc stop position 308.

FIGS. 4-1 through 4-13 show a prior art method of performing a read operation as in FIGS. 3-1 through 3-3 but this time with read errors encountered at sectors 3, 6 and 7 on track 302 of disc 202. In order to read sectors 0–9 correctly, it is assumed in this example that sector 3 requires three retries, sector 6 requires two retries, and sector 7 requires one retry.

Referring now to FIG. 4-1, disc 202 on which a prior art disc read operation begins during a first disc revolution at disc start position 306 on sector 0 is shown. A read error is encountered at sector 3 resulting in the read cycle stopping, shown by disc stop position 308.

Referring now to FIG. 4-2, a portion of buffer memory 212 after the read cycle stops at sector 3 is shown. Data has been successfully recovered from sectors 0, 1 and 2 into memory locations 310, 311 and 312 respectively. Memory location 313 indicates a sector read error on sector 3 and the remaining memory locations 314–320 are empty. Because the read cycle has stopped, controller 128 needs to wait for a second disc revolution before it can re-read sector 3.

Referring now to FIG. 4-3, a retry cycle performed on sector 3 that results in an unsuccessful read in accordance with the prior art disc read operation is shown. The disc start position 306 and disc stop position 308 are both on sector 3 because a read attempt on sector 3 has again failed. Since this retry cycle has failed, FIG. 4-4 shows memory locations 310–320 containing the same information as in FIG. 4-2. The retry cycles are repeated until sector 3 is read successfully (three times in this example), with each retry cycle requiring a disc revolution.

Figures 4, 5:
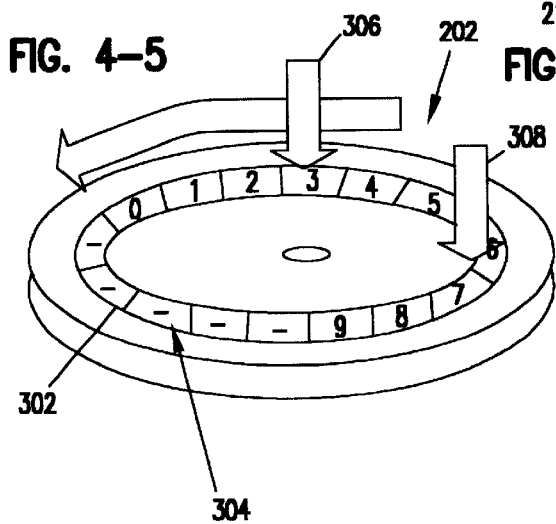

Referring now to FIG. 4-5, a successful third prior art retry cycle performed on sector 3 is shown. Here, sector 3 is read correctly and controller 128 continues to attempt to read sectors 4, 5, etc. Information is recovered from sectors 4 and 5 but a read error is encountered at sector 6. Therefore, for this retry cycle, disc start position 306 was at sector 3 and disc stop position 308 is at sector 6.

Figures 4, 5, 6:
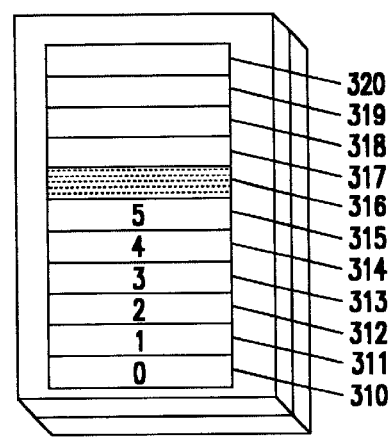

Referring now to FIG. 4-6, data recovered from sectors 0–5 stored in memory locations 310–315 is shown. Memory location 316 indicates a sector read error on sector 6 and the remaining memory locations 317–320 are empty.

Referring now to FIG. 4-7, a prior art retry cycle performed on sector 6 that results in an unsuccessful read is shown. The disc start position 306 and disc stop position 308 are both on sector 6 because a read attempt on sector 6 has again failed. Since this retry cycle has failed, FIG. 4-8 shows memory locations 310–320 containing the same information as in FIG. 4-6. The retry cycles are repeated until sector 6 is read successfully (twice in this example), with each retry cycle requiring a disc revolution.

Referring now to FIG. 4-9, a successful second prior art retry cycle performed on sector 6 is shown. Here, sector 6 is read correctly and controller 128 continues the read attempt, but a read error is encountered at sector 7. Therefore, for this retry cycle, disc start position 306 was at sector 6 and disc stop position 308 is at sector 7.

Referring now to FIG. 4-10, data recovered from sectors 0–6 stored in memory locations 310–316 is shown. Memory location 317 indicates a sector read error on sector 7 and the remaining memory locations 317–320 are empty.

Referring now to FIG. 4-11, a successful first prior art retry cycle performed on sector 7 is shown. Here, sector 7 is read correctly, and this time controller 128 continues to read the two remaining sectors 8 and 9 to complete the read operation. The disc start position 306 was at sector 7 and disc stop position 308 is at sector 9 for this retry cycle. FIG. 4-12 shows memory locations 310–319 populated with data recovered from sectors 0–9.

Referring now to FIG. 4-13, a timing diagram 400 of the read operation of the above example is shown. Timing diagram 400 includes states of servo gate 324 and read gate 326 during a normal read cycle plotted along time axis 328. Timing diagram 400 also includes states of the read gate during the three retry cycles performed on sector 3, shown as, first retry cycle on sector 3 402, second retry cycle on sector 3 404 and third retry cycle on sector 3 406 plotted along time axis 328. In addition, the two retry cycles for sector 6 are shown as, first retry cycle on sector 6 408 and second retry cycle on sector 6 410 plotted along time axis 328. The single retry cycle for sector 7 412 is also shown. A total of seven read cycles 438 were performed in this example. These include six extraneous read revolutions, one for each of the six retry cycles.

FIGS. 5-1 through 5-9 re-illustrate the example shown in FIGS. 4-1 through 4-13 (sector 3 requiring three retries, sector 6 requiring two retries, and sector 7 requiring one retry) using a new read retry method in accordance with one embodiment of the present invention.

Referring now to FIG. 5-1, a disc read cycle of a disc read operation in accordance with one embodiment of the present invention is shown. Here, a disc read cycle is performed during one disc revolution on all of sectors 0–9 even though an attempt to recover data from sectors 3, 6 and 7 has failed. Disc start position 306 is at sector 0 and disc stop position 308 at sector 9, indicating that the disc read operation has been performed on all sectors 0 through 9 even though read errors are encountered at sectors 3, 6 and 7.

Referring now to FIG. 5-2, data recovered from sectors 0–2, 4–5 and 8–9 stored in memory locations 310–312, 314–315 and 318–319 respectively is shown. Memory locations 313, 316 and 317 indicate sector read errors on sectors 3, 6 and 7 respectively. Remaining memory location 320 is empty.

Referring now to FIG. 5-3, a first retry cycle of a disc read operation in accordance with one embodiment of the present invention is shown. The first retry cycle includes an attempt to recover data from all failed sectors during the read cycle (sectors 3, 6 and 7 in this example). The first retry cycle is performed on all the failed sectors (3, 6 and 7) during one disc revolution. The attempt to read sectors 3 and 6 is unsuccessful with sector 7 being successfully read in the first retry cycle. FIG. 5-4 shows memory location 317 updated with data from sector 7 after the first retry cycle. FIGS. 5-5 and 5-6 show results of a second retry cycle performed on all failed sectors left after the first retry cycle (sectors 3 and 6). Memory location 316 is updated with data recovered from sector 6 during the second retry cycle, with the read attempt on sector 3 still remaining unsuccessful. FIGS. 5-7 and 5-8 show results of a third (last) retry cycle performed for this read operation. Here, data from sector 3, the only failed sector remaining, is recovered successfully. FIG. 5-9 shows a timing diagram 500 in accordance with one embodiment of the present invention. Here, the read operation is completed in four cycles (one read and three retry cycles) read cycle 312, first retry cycle 502, second retry cycle 504 and third retry cycle 506 which involve a total four cycles 508. At the end of all the read and retry cycles, only three extraranious revolutions are incurred in this approach. Therefore, there is a fifty percent reduction in overhead as compared with the prior art implementation shown in FIGS. 4-1 through 4-13 for the same example.

Table 1 below shows the number of extraranious disc revolutions under various retry conditions, assuming a track of 500 sectors is being read. The saving becomes more significant with more failed sectors are encountered and less retry attempts needed per sector.

TABLE 1

| | Number of disc revolutions | | |
| --- | --- | --- | --- |
| | Prior art implementation | Method employed in the preferred embodiment of the present invention | Amount saved |
| Read with no error. i.e. 0 retry | 1 | 1 | 0 |
| 5 failed sectors, with each failed sector requiring 1 retry | 6 | 2 | 4 |
| 10 failed sectors, with each failed sector requiring 1 retry | 11 | 2 | 9 |
| 20 failed sectors, with each failed sector requiring 2 retries | 41 | 3 | 38 |
| 1 failed sector requiring 5 retries and 30 failed sectors needing 1 retry | 36 | 6 | 30 |

Referring now to FIG. 6, a retry list 600 useful in one embodiment of the present invention is shown. Retry list 600 shows a group of registers 602 that are automatically updated with failed sector information when a disc read operation is performed, without requiring a read or retry cycle to stop when a failed sector is encountered. The most significant bit of each register contains a validity bit 604 to indicate if an entry to the retry list is valid. Each register also includes sector number 606 and buffer memory location 608 of each failed sector. During a read or retry cycle, sector number 606 and buffer memory location 608 of each failed sector is saved into retry list 600. An entry is removed from retry list 600 if the corresponding sector is recovered during subsequent retry cycles. This is done without the expense of stopping the read operation. During the read cycle, the controller 128 turns on the read gate at the erroneous sectors based on the retry list. The retry cycles stop when the last sector in error is read successfully.

Figures 4, 5, 6, 7:
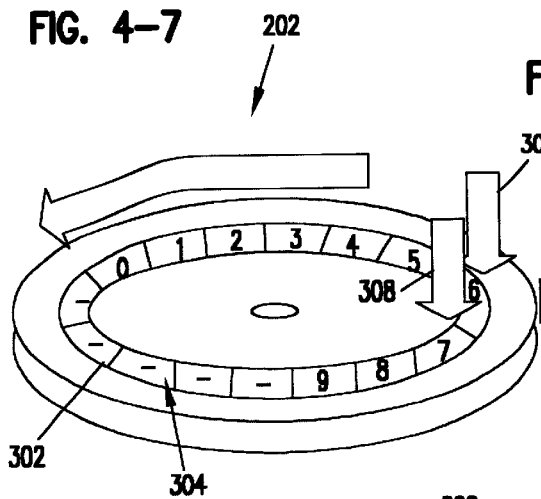
Figures 4, 5, 6, 7, 8:
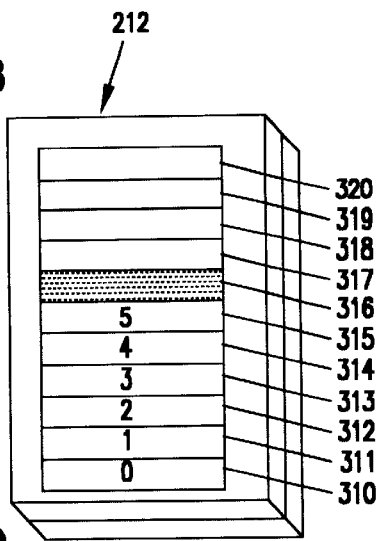
Figures 4, 5, 6, 7, 8, 9:
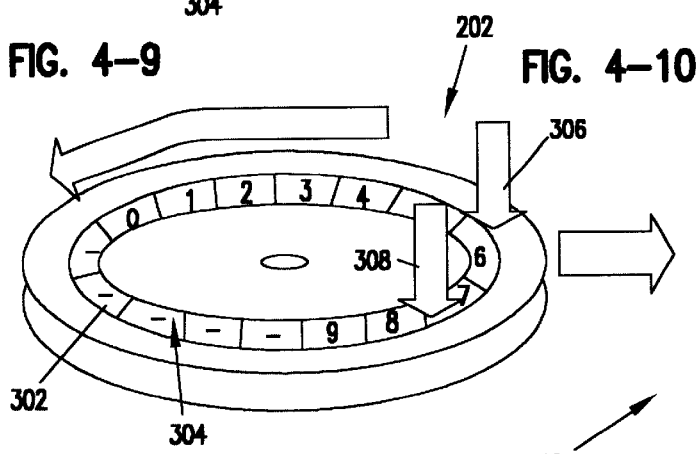
Figures 4, 5, 6, 7, 8, 9, 10:
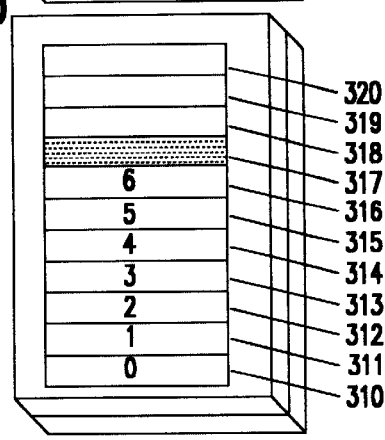
Figures 4, 5, 6, 7, 8, 9, 10, 11:
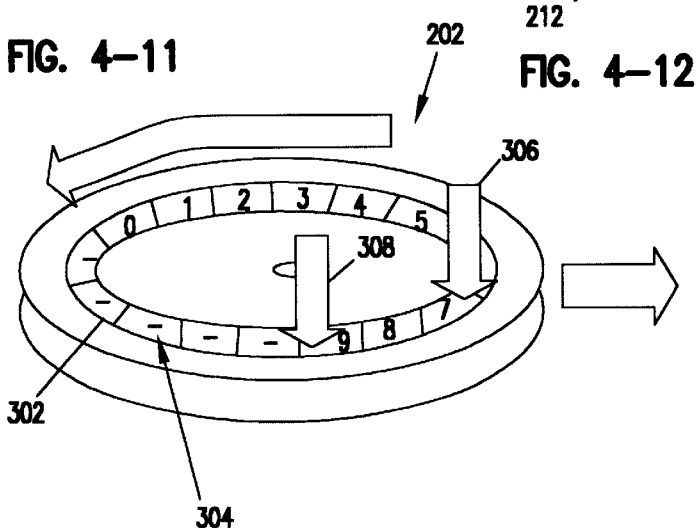
Figures 4, 5, 6, 7, 8, 9, 10, 11, 12:
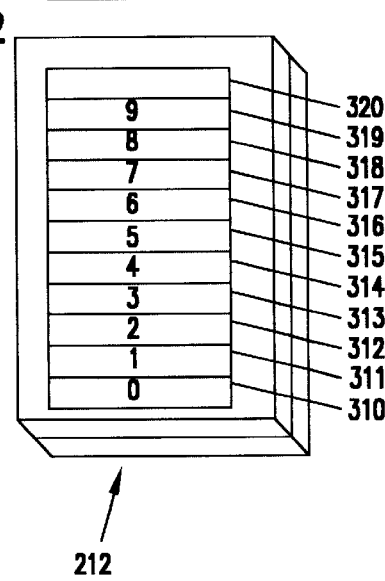
Figures 4, 5, 6, 7, 8, 9, 10, 11, 12, 13:
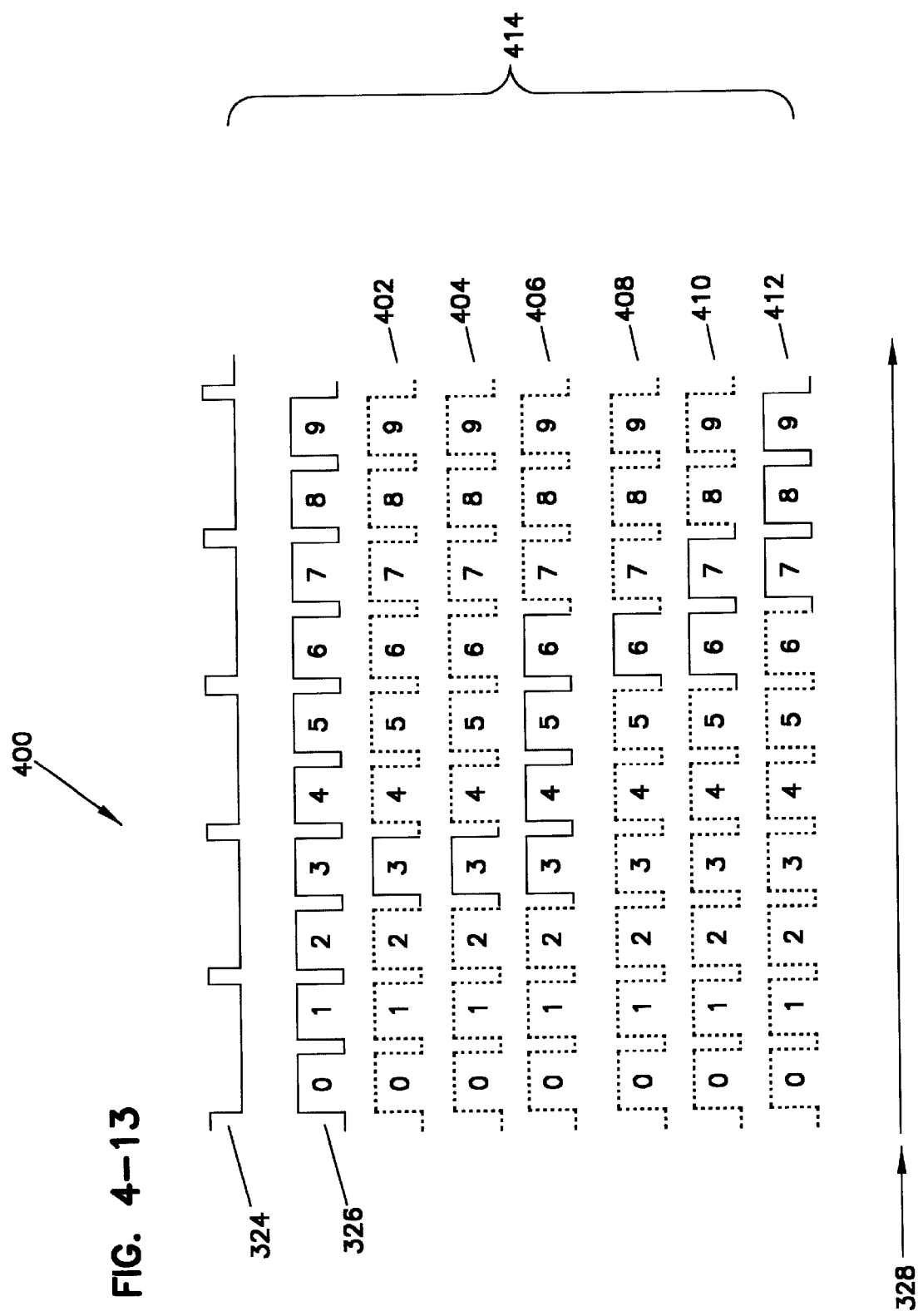
Figures 1, 5:
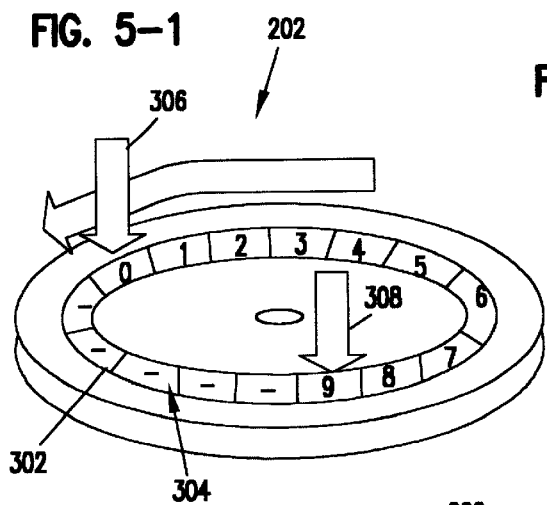
Figures 2, 5:
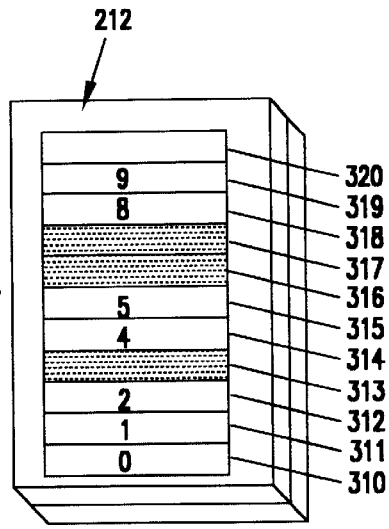
Figures 3, 5:
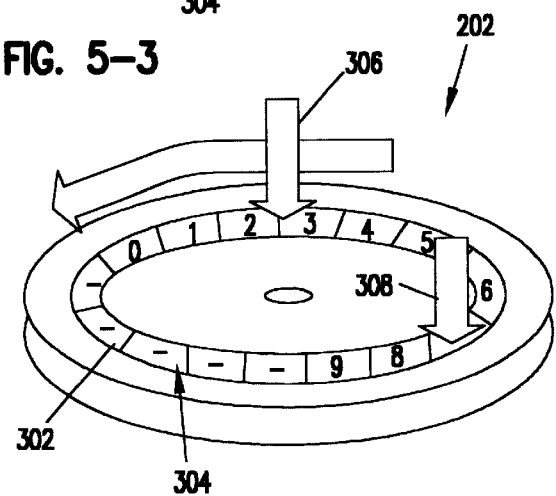
Figures 4, 5:
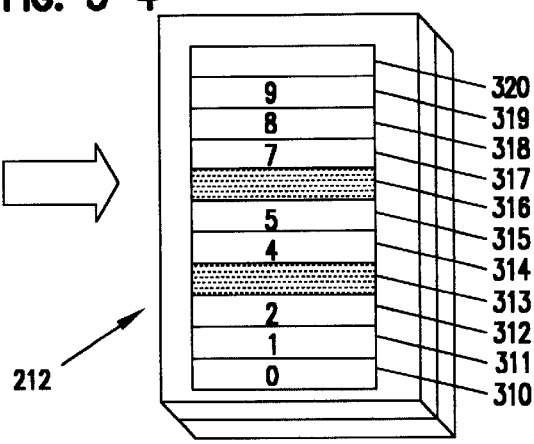
Figure 5:
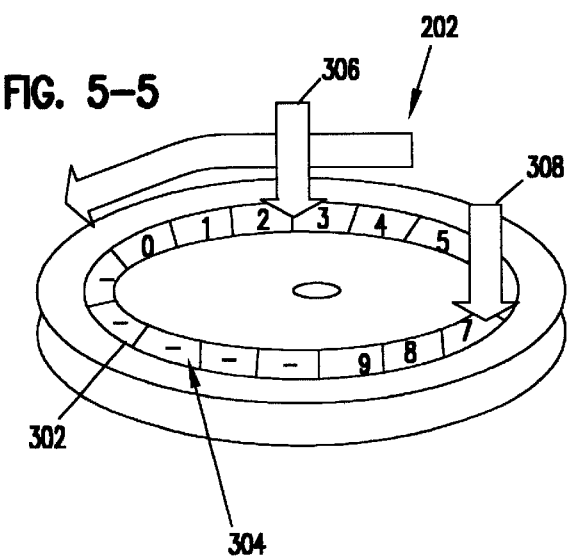
Figures 5, 6:
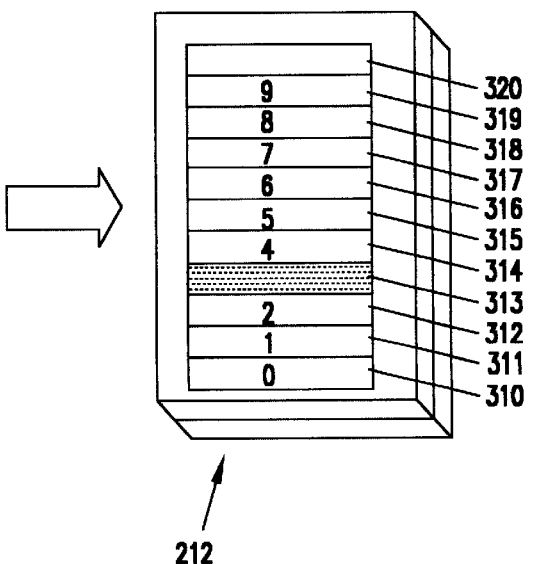
Figure 6:
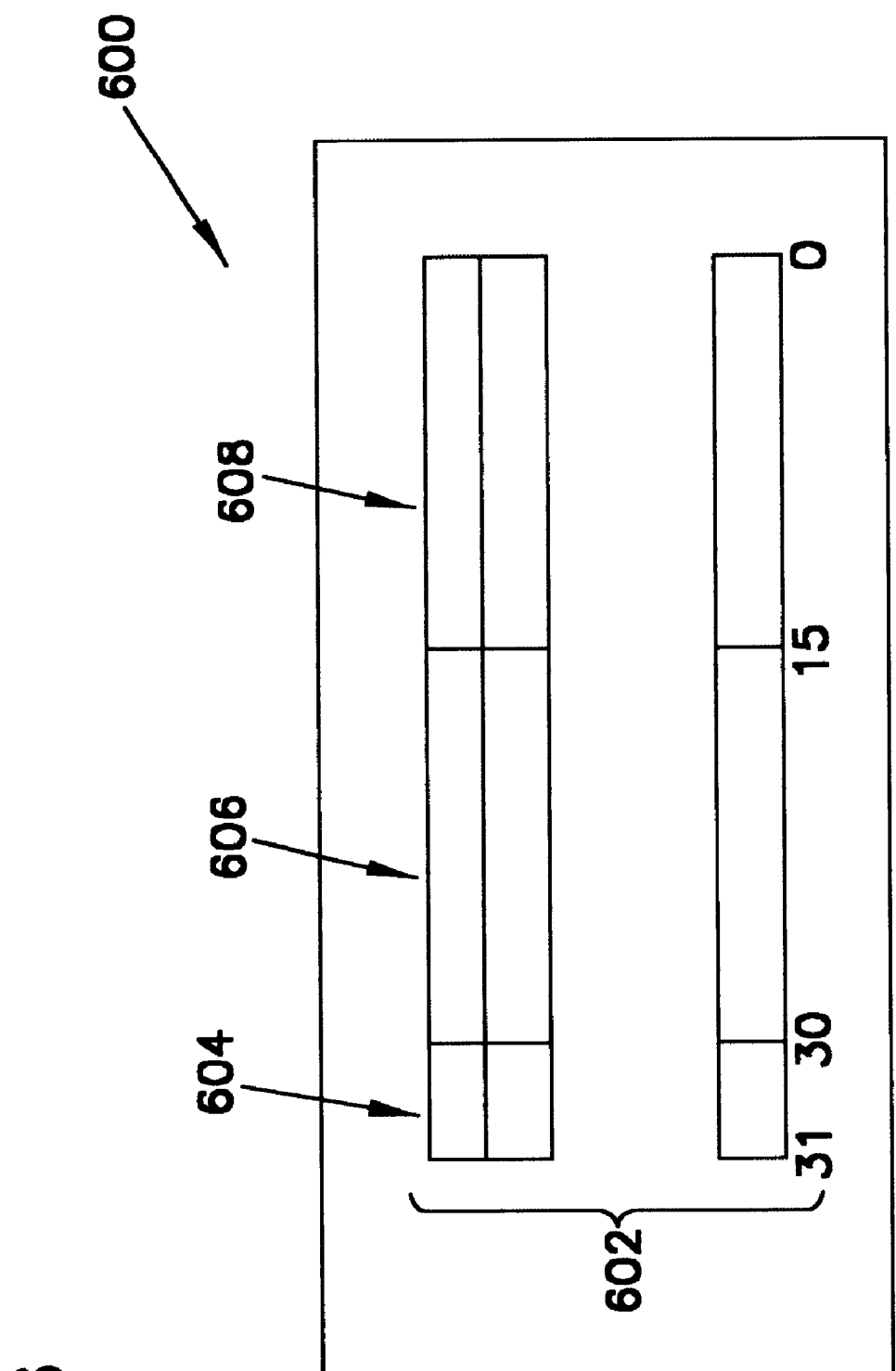

Referring now to FIG. 7, a flow diagram illustrating a method of performing a disc read operation in accordance with one embodiment of the present invention is shown. At block 710 of FIG. 7, a number of physical sectors to be read from a disc during a disc read operation is determined. In block 720, all sectors of the number of sectors are attempted to be read during a first disc revolution. At block 730, failed sectors of the number of sectors during the first disc revolution are identified. At block 740, a retry cycle is performed on failed sectors during a second disc revolution following the completion of the attempt to read all sectors of the number of sectors during the first disc revolution.

Various embodiments of the present invention can be summarized in reference to the figures, which illustrate (1) HDA 100 and components thereof, (2) block diagram of a disc drive storage system 200, and (3) examples of the new read retry method. The disc drive storage system includes a rotating disc 202 having a disc surface and a transducer head 110 that reads from the disc surface. Also included are a buffer memory 212 and a controller 128. Controller 128 determines a number of physical sectors (sectors 0–9) to be read from a destination track 302 on disc 202. Controller 128 attempts to read all sectors 0–9 into buffer memory 212 during a first disc revolution. Controller 128 also identifies failed sectors of sectors 0–9 during the first disc revolution, and then performs a retry cycle on failed sectors during a second disc revolution following the completion of the attempt to read sectors 0–9 into buffer memory 212 during the first disc revolution.

In various embodiments of the present invention, controller 128 repeats the retry cycle until all failed sectors are recovered. In various embodiments of the present invention, controller 128 of the disc drive storage system further includes a memory retry list 600 to store information related to the failed sectors. In various embodiments of the present invention, memory retry list 600 further includes a plurality of registers 602 with each of the plurality of registers storing information related to a failed sector of all failed sectors. In various embodiments of the present invention, each of the plurality of registers 602 of memory retry list 600 include a validity bit 604 to indicate that an entry in the memory retry list is valid, a sector number field 606 to store the failed sector number; and a location field 608 to store a corresponding failed sector location in buffer memory 212 that has no data recovered for the failed sector.

In various embodiments of the present invention, controller 128 is further adapted to remove the failed sector information from each memory register of the plurality of memory registers 602 when the corresponding failed sector is read. In various embodiments of the present invention, controller 128 is further adapted to selectively operate read gate 326 to enable data recovery attempts only on failed sectors during the retry cycle. In various embodiments of the present invention, controller 128 is further adapted to receive failed sector identification information returned by an error correction algorithm, and to store failed sector identification information in a memory retry list 600.

Embodiments of the present invention include a method of reducing retry redundancy during a disc read operation in a disc drive storage system. The method includes determining a number of physical sectors (sectors 0–9) to be read from a disc 202 during the disc read operation and attempting to read all sectors of the number of sectors 0–9 during a first disc revolution. The method also includes identifying failed sectors of the number of sectors 0–9 during the first disc revolution, the failed sectors being sectors on which read errors are encountered. A retry cycle is then performed on failed sectors during a second disc revolution following completion of the attempt to read all sectors of the number of sectors 0–9 during a first disc revolution.

In various embodiments of the present invention, the retry cycle is repeated until all failed sectors are recovered. In various embodiments of the present invention, identifying failed sectors is performed by storing failed sector identification information in a memory retry list 600 during the first disc revolution. In various embodiments of the present invention, stored failed sector identification information is removed from the memory retry list 600 when each corresponding failed sector is recovered. In various embodiments of the present invention, include selectively operating a read gate 326 to enable data recovery attempts only on failed sectors during the retry cycle. In various embodiments of the present invention, identifying failed sectors includes receiving failed sector identification information returned by an error correction algorithm and storing failed sector identification information in a memory retry list 600.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc read operation while maintaining substantially the same functionality without departing from the scope and spirit of the present invention. In addition, although the preferred embodiment described herein is directed to a method and apparatus for reducing retry redundancy during disc read operations for a disc drive storage system, it will be appreciated by those skilled in the art that the teachings of the present invention can be applied to systems, like magnetic, optical or other storage system techniques, without departing from the scope and spirit of the present invention.

What is claimed is:

1. A method of reducing retry redundancy during a disc read operation in a disc drive storage system, the method comprising:
   (a) attempting to read a number of sectors during a disc revolution;
   (b) identifying failed sectors in the number of sectors during the disc revolution; and
   (c) performing a retry cycle on at least two failed sectors during a subsequent disc revolution.

2. The method of claim 1, including repeating the retry cycle step (c) until all failed sectors are recovered.

3. The method of claim 2, wherein the identifying failed sectors step (b) is performed by storing failed sector identification information in a memory retry list during the first disc revolution.

4. The method of claim 3, including removing stored failed sector identification information from the memory retry list when each corresponding failed sector is recovered.

5. The method of claim 1, including selectively operating a read gate to enable data recovery attempts only on failed sectors during the retry cycle step (c).

6. The method of claim 1, wherein the identifying failed sectors step (b) is performed by storing failed sector identification information in a memory retry list during the first disc revolution.

7. The method of claim 6, including removing stored failed sector identification information from the memory retry list corresponding to failed sectors recovered during the performance of retry cycle step (c).

8. The method of claim 1, wherein identifying failed sectors step (b) comprises:
   (b) (1) receiving failed sector identification information returned by an error correction algorithm; and
   (b) (2) storing failed sector identification information in a memory retry list.

9. A disc drive storage system including a rotating disc having a disc surface, a transducer head configured to read from the disc surface, implementing the method of claim 1.

10. A disc drive storage system, comprising:
    a controller configured to attempt to read a number of sectors during a disc revolution, and to identify failed sectors in the number of sectors during the disc revolution, and to perform a retry cycle on at least two failed sectors during a subsequent disc revolution.

11. The disc drive data storage system of claim 10, wherein the controller is further adapted to repeat the retry cycle until all failed sectors are recovered.

12. The disc drive data storage system of claim 11, wherein the controller further includes a memory retry list to store information related to the failed sectors.

13. The disc drive data storage system of claim 12, wherein the memory retry list includes a plurality of registers with each of the plurality of registers storing information related to a failed sector of all failed sectors.

14. The disc drive data storage system of claim 13, wherein each of the plurality of registers of the memory retry list comprises:
    a validity bit to indicate that an entry in the memory retry list is valid;
    a sector number field to store the failed sector number; and
    a location field to store a corresponding failed sector location in buffer memory that has no data recovered for the failed sector.

15. The disc drive data storage system of claim 14, wherein the controller is further adapted to remove the failed sector information from each memory register of the plurality of memory registers when the corresponding failed sector is read.

16. The disc drive storage system of claim 13, including a read gate and wherein the controller is further adapted to selectively operate the read gate to enable data recovery attempts only on failed sectors during the retry cycle.

17. The disc drive data storage system of claim 10, wherein the controller further includes a memory retry list to store information corresponding to the failed sectors.

18. The disc drive data storage system of claim 17, wherein the controller is further adapted to remove the failed sector information from the memory retry list when each corresponding failed sector is recovered.

19. The disc drive storage system of claim 10, wherein the controller is further adapted to receive failed sector identification information returned by an error correction algorithm, and to store failed sector identification information in a memory retry list.

20. A disc drive storage system for storing information on a surface of a rotatable disc, comprising:
    a transducer for reading and writing information to the disc surface; and
    a controller means for reducing redundancy during disc read operations by performing a retry on identified failed sectors.

21. The disc storage system of claim 20 wherein the controller means includes a controller configured to attempt to read a number of sectors during a disc revolution, and to identify failed sectors in the number of sectors during the first disc revolution, and to perform a retry cycle on at least two failed sectors during a subsequent disc revolution.

22. The disc drive data storage system of claim 21, wherein the controller is further adapted to repeat the retry cycle until all failed sectors are recovered.

23. The disc drive data storage system of claim 22, wherein the controller further includes a memory retry list to store information related to the failed sectors.

24. The disc drive data storage system of claim 23, wherein the memory retry list includes a plurality of registers with each of the plurality of registers storing information related to a failed sector of all failed sectors.

25. The disc drive data storage system of claim 24, wherein each of the plurality of registers of the memory retry list comprises:
    a validity bit to indicate that an entry in the memory retry list is valid;
    a sector number field to store the failed sector number; and
    a location field to store a corresponding failed sector location in buffer memory that has no data recovered for the failed sector.

* * * * *